2,717,240
METHOD OF MAKING MAGNESIUM META-BORATE SOLUTIONS

George D. Fronmuller, Mamaroneck, N. Y., assignor to Commonwealth Color & Chemical Co., New York, N. Y., a corporation of New York No Drawing. Application February 1, 1952, Serial No. 269,603

7 Claims. (Cl. 252—8.6)

The present invention is directed to the production of magnesium meta borate in soluble form and more particularly to a solution which is substantially stable.

Magnesium meta borate has previously been made but it has been water-insoluble and, therefore, could not be applied to such uses where aqueous solutions thereof are required. The literature on the subject has reference to a number of compounds of magnesium and boron, such as the ortho borate, di-borate and tetra-borate. All of these compounds were insoluble and, therefore, the usefulness thereof was seriously restricted.

The present invention is intended and adapted to overcome the disadvantages inherent in the magnesium meta borate as previously prepared, it being among the objects of the present invention to provide stable solutions of magnesium meta borate which may be stored for considerable periods of time and which are useful in various operations.

It is also among the objects of the present invention to provide a simple and effective method of conducting a reaction to produce an aqueous solution of magnesium meta borate, the yield being substantially quantitative.

It is further among the objects of the present invention to provide a solution of magnesium meta borate which may be added to solutions or suspensions of various substances in order to improve the treatment of fibrous materials such as fabrics and paper with such solutions or suspensions.

In practicing the present invention there is provided a solution of water-soluble magnesium salt and a water-soluble meta borate. The constituents are mixed in approximately equimolecular proportions and it is important that the reaction take place at a relatively low temperature. Usually the temperatures are about the ordinary room temperatures or somewhat above. Solutions of this kind are quite stable and may be kept for many months without any substantial amount of precipitation. The pH of the solution is between 6.5 and 9.0. The solutions have the property that when heated to substantially above room temperatures, say from 50° to 100° C., precipitation occurs and the precipitate does not redissolve upon standing. This is of importance in the treatment of fibrous materials where certain substances are added as filler materials thereof.

The following are specific examples of the operation of the present invention.

Example 1

A solution is made consisting of 15 lbs. of magnesium chloride hexahydrate in 15 lbs. of water. Separately a solution is made of 10.2 lbs. of sodium meta borate tetrahydrate in 50 lbs. of water. The pH of this solution is adjusted to about 9 with a dilute acid such as hydrochloric or sulphuric acids.

The temperature of the solutions is adjusted to about 25° C. and the solution of the sodium meta borate is added to the magnesium chloride at a sufficiently slow rate with stirring to prevent the heat of neutralization from raising the temperature of the solution more than a few degrees and to eliminate local action in the solution. The final pH of the solution is about 7.

It is important to maintain the pH either on the alkaline side or neutral but the pH should not be on the acid side to any great extent. If the pH is 6 or less, the solution of magnesium meta borate will not precipitate upon the application of heat and the raising of the temperature thereof. Therefore, the pH of the solution of magnesium meta borate is to be maintained at at least 6.5. If the pH is at about 9, the temperature at which precipitation may be caused to occur is about 27° to 30° C. Under some circumstances this temperature of precipitation would be too low for complete stability of the solution particularly during summer temperatures. Adjusting the pH to about 7 causes the precipitation temperature to be raised to about 45° C. The solution as prepared contains 12% to 13% of magnesium meta borate and in all cases it is preferred that it contain at least 2% thereof.

Example 2

A solution is prepared of sodium tetraborate in water, the amount of tetraborate in solution being approximately 20%. The pH thereof is adjusted to 9. A second solution of magnesium chloride in water is provided. The two solutions are mixed, as set forth in Example 1, whereby a solution of magnesium meta borate containing a double salt, which is sodium magnesium decaborate, is formed. The latter salt has the effect of decreasing the stability of the solution of magnesium meta borate so that the shelf life theerof is decreased unles special precautions are taken.

The solution of magnesium meta borate may be used in the treatment of fibrous materials. In order to increase the rate of exhaustion of gums, starches, synthetic latex, proteins and the like and mixtures of such substances from solutions for treatment of fibrous materials, the addition of a relatively small amount of the magnesium meta borate solution makes it possible to provide considerable economies in the use of these substances. The solution of magnesium meta borate may be added to paraffin wax emulsions for treatment of paper, for example.

For example, when a cotton and wool fabric is treated with a suspension of starch equal to about 7% of starch based upon the weight of the fabric and containing about 2% of the magnesium meta borate in solution, a 2% pickup of starch is obtained. Normally a similar solution of starch but not containing the magnesium meta borate will pick up only .17% of starch. This indicates the high efficiency and substantial economy obtained by the use of the present solutions.

The addition of the magnesium meta borate solution to suspensions of certain gums, such as locust bean gum or soya protein or casein or the like increases the stiffening effect of these substances when applied to fabrics, paper and the like. The solution may also be used in the formation of a pigment in the fibrous material.

The solutions of magnesium meta borate also improve the hand of tissue paper, giving an effect similar to that obtained when talc is applied to such paper. The solution is sprayed on, thus giving a more uniform distribution of the magnesium meta borate on the paper. This permits a better anchoring of the pigment and reduces dusting. When the paper is dried at an elevated temperature, the magnesium meta borate becomes insoluble and is retained as an integral part of the paper.

I claim:

1. A method which comprises mixing a solution of magnesium chloride with a solution of an alkali metal meta borate in substantially equimolecular proportions at a temperature not substantially higher than 25° C.

while maintaining a pH of 6.5–9.0 in the mixed solution whereby a stable solution of magnesium meta borate is formed, the concentration of said solutions being sufficient to form at least a 2% solution of magnesium meta borate which is stable at temperatures lower than 50° C.

2. A method which comprises mixing a solution of magnesium chloride with a solution of an alkali metal meta borate in substantially equimolecular proportions at temperatures not substantially higher than 25° C. while maintaining a pH of 6.5–9.0 in the mixed solution whereby a stable solution of magnesium meta borate is formed, the concentration of said solutions being sufficient to form at least a 2% solution of magnesium meta borate which is stable at temperatures lower than 50° C., heating said solution above 50° C., whereby said magnesium meta borate is precipitated as an insoluble compound which does not redissolve at temperatures below 50° C.

3. A method which comprises mixing a solution of magnesium chloride with a solution of an alkali metal meta borate having a pH of about 9 in substantially equimolecular proportions at a rate sufficient to prevent the heat of reaction from raising the temperature of the resultant solution appreciably above 25° C. while maintaining a pH of 6.5–9.0 in the mixed solution whereby a stable solution of magnesium meta borate is formed, the concentration of said solutions being sufficient to form at least a 2% solution of magnesium meta borate which is stable at temperatures below 50° C., heating said solution above 50° C., whereby said magnesium meta borate is precipitated as an insoluble compound which does not redissolve at temperatures below 50° C.

4. An aqueous solution of magnesium meta borate containing at least 2% thereof, being stable at temperatures lower than 50° C., and having a pH of about 6.5 to 9.0.

5. An aqueous solution of magnesium meta borate containing at least 2% thereof, said solution having a pH of about 6.5 to 9.0 and being stable at temperatures appreciably lower than 50° C. and said magnesium meta borate being capable of precipitating out of solution as an insoluble salt when the temperature of said solution is elevated appreciably above 50° C.

6. An aqueous solution of magnesium meta borate containing at least 2% thereof and an alkali metal chloride, said solution having a pH of 6.5 to 9.0, being stable at about 27°–30° C. when said pH is about 9.0 and at about 45° C. when said pH is about 7.0, becoming insoluble when heated above said temperatures, without redissolving below said temperatures.

7. A method which comprises mixing a solution of magnesium chloride with a solution of an alkali metal meta borate in substantially equimolecular proportions at a temperature not substantially higher than 25° C. while maintaining a pH of 6.5 to 9.0 in the mixed solution, whereby a stable solution of magnesium meta borate is formed, heating said solution to about 27°–30° C. when said pH is about 9 and to a temperature of about 45° C. when the pH is about 7.0, whereby said magnesium meta borate is precipitated as an insoluble compound which does not redissolve at temperatures lower than the temperatures of precipitation.

References Cited in the file of this patent

UNITED STATES PATENTS 1,860,134    Brown _____ May 24, 1932

FOREIGN PATENTS 3,388    Great Britain _____ of 1914

OTHER REFERENCES

Mellor, A Comprehensive Treatise on Inorganic and Theoretical Chemistry, Longmans, Green and Co., New York, 1924, vol. 5, pages 97, 98. (Copy in Div. 59.)

Comey, A Dictionary of Chemical Solubilities, Macmillan Co., N. Y., 1921, pages 101, 105. (Copy in Div. 59.)